(12) United States Patent
Armstrong et al.

(10) Patent No.: US 6,706,307 B2
(45) Date of Patent: Mar. 16, 2004

(54) PREPARATION OF CRUMB PRODUCTS FOR CHOCOLATE PRODUCTION

(75) Inventors: Euan Armstrong, St. Andrewgate (GB); Sophie Carli, Heworth (GB); Richard Gibson, Tadcaster (GB); Loreta Jercher, Heworth (GB); Brian Samuel, Wigginton (GB)

(73) Assignee: Nestec S.A., Vevey (CH)

( * ) Notice: Subject to any disclaimer, the term of this patent is extended or adjusted under 35 U.S.C. 154(b) by 491 days.

(21) Appl. No.: 09/823,013

(22) Filed: Mar. 30, 2001

(65) Prior Publication Data

US 2001/0012536 A1 Aug. 9, 2001

Related U.S. Application Data

(63) Continuation of application No. 09/260,855, filed on Mar. 1, 1999, now Pat. No. 6,261,627.

(30) Foreign Application Priority Data

Mar. 2, 1998 (GB) .............................. 9804401

(51) Int. Cl.⁷ .............................. A23C 9/16; A23G 1/00
(52) U.S. Cl. ...................... 426/584; 426/588; 426/631; 426/660
(58) Field of Search ................. 426/584, 588, 426/631, 660

(56) References Cited

U.S. PATENT DOCUMENTS

| | | | |
|---|---|---|---|
| 3,622,342 A | 11/1971 | Rusoff | |
| 4,081,568 A | 3/1978 | Bracco | 426/584 |
| 4,084,011 A | 4/1978 | Chevalley | 426/584 |
| 4,086,371 A | 4/1978 | Minifie et al. | 426/658 |
| 4,346,121 A | 8/1982 | Turos | 426/580 |
| 4,980,189 A | 12/1990 | Keme et al. | 426/548 |
| 5,080,923 A | 1/1992 | Martin et al. | 426/658 |
| 5,626,900 A | 5/1997 | Miller | 426/580 |
| 5,932,277 A | 8/1999 | Dubberke | 426/631 |
| 5,962,063 A | 10/1999 | Siukola et al. | 426/631 |

FOREIGN PATENT DOCUMENTS

| | | |
|---|---|---|
| DE | 3502446 | 7/1986 |
| EP | 0248462 | 9/1987 |
| GB | 1196380 | 6/1970 |
| GB | 1364500 | 8/1974 |
| GB | 1425839 | 2/1976 |
| GB | 1537377 | 12/1978 |
| WO | 9424883 | 11/1994 |

OTHER PUBLICATIONS

Beckett, Editor, Industrial Chocolate Manufacture and Use, Second Edition, 1994, Blackie Academic & Professional, London, U.K., pp. 43, 50–54 and 258–263.

Minifie, Chocolate, Cocoa and Confectionery; Science and Technology, Third Edition, 1989 Chapman and Hall, N.Y., N.Y., U.S.A., pp. 135–136, 144–148 and 164.

Derosier, Elements of Food Technology, Avi Publishing Company, Inc., Westport, CT, 1977, p. 434.

Database Abstract, Derwent Information, Ltd., WPI Accession No. 86–205333/198632, XRAM Accession No. C86–088252, abstract of Lipp, German Patent Application Publication No. DE 35 02 446.

*Primary Examiner*—Arthur Corbin
(74) *Attorney, Agent, or Firm*—Winston & Strawn LLP

(57) ABSTRACT

Crumb products for preparing chocolate products are prepared by adding together, mixing and heating ingredients which include milk solids and a sugar ingredient, particularly sucrose, and which include, optionally, cocoa solids and so that the ingredients added together, mixed and heated have a moisture content between 1.2% and 8%. The ingredients added together are mixed and heated so that the ingredients being mixed are heated-up to a temperature in a range of from 85° C. to 180° C. an so that upon being heated-up to a temperature in the range which is a temperature of at least 85° C. and up to 180° C., the ingredients being mixed are maintained at a temperature in a range of from 85° C. to the heated-up temperature for a period of from 2.5 minutes to 25 minutes to provide a heat-treated reaction product, and then the reaction product is dried at a temperature of from 60° C. to 80° C., which may be performed without vacuum conditions.

18 Claims, No Drawings

PREPARATION OF CRUMB PRODUCTS FOR CHOCOLATE PRODUCTION

CROSS-REFERENCE TO RELATED APPLICATION

This is a continuation application of Application Ser. No. 09/260,855 which was filed Mar. 1, 1999 now U.S. Pat. No. 6,261,627.

BACKGROUND OF THE INVENTION

The present invention relates to processes and ingredient formulations for preparing crumb products, particularly chocolate crumb products, which include milk solids and sweetener, for preparing chocolate products and to preparation of chocolate products with the crumb products.

Milk chocolate differs from dark or plain chocolate in that it contains milk solids and the essential part of a process for preparing milk chocolate is the method used to incorporate the milk solids. Milk chocolate is virtually moisture-free in that it contains from 0.5–1.5% water, while full cream milk contains about 87,5% water, the remainder being about 12.5% milk solids including fat.

One method of removing the 87.5% water from the milk is by evaporation of the liquid milk and drying to a powder, and a traditional method of producing milk chocolate is by mixing the milk powder together with cocoa liquor or cocoa nibs, sugar, and cocoa butter, followed by refining, conching and tempering.

Another method which results in removing the 87.5% water from milk is by condensing and drying a mixture comprising either liquid milk or milk concentrate together with sugar and cocoa liquor under vacuum and at elevated temperatures to produce a chocolate crumb powder. This process for making chocolate crumb was originally intended to preserve milk solids in a stable form over long periods of time, and the chocolate crumb is used as an intermediary product in another traditional method of production of milk chocolate which comprises mixing chocolate crumb with cocoa butter, followed by refining, conching and tempering.

One advantage of chocolate crumb powder is that it has excellent storage properties and prevents rancidity of the fats in the milk. This enables the chocolate crumb to be manufactured well in advance of the manufacture of the milk chocolate, and the crumb can be transported easily to any desired destination. In addition, the use of chocolate crumb instead of milk powder provides a rich, creamy partially caramelised flavor which has proved extremely desirable to a large number of consumers. Although milk is sometimes transported to chocolate factories where the crumb is produced, since milk soon turns sour, it is preferable to install the crumb factories in dairy farming rural regions where there is a steady supply of fresh liquid milk. Often the crumb factories are in chocolate factories in dairy regions.

It would be convenient to manufacture crumb-type chocolates in regions where it has not previously been feasible and attempts have been made to imitate the flavor produced by the crumb process using standard milk powders. However, none of these methods has yet produced an adequate substitute.

For example, Great Britain Complete Patent Specification No. 1 425 839 describes a method of manufacturing a milk chocolate, wherein the process steps comprise melting sugar by heating it to a temperature of between 188° and 210° C., mixing the heated, molten sugar with milk powder, and processing the mixture with other chocolate—making ingredients to form a milk chocolate. However, molten sugar is difficult to handle and requires a high energy input, amorphous sugar may be formed together with a high viscosity which could influence the texture and lead to non-desirable flavors at the high temperature used.

U.S. Pat. No. 3,622,342 describes a method for preparing chocolate crumb from milk solids by dry blending the milk solids with sugar and cocoa liquor and then extrusion—cooking the mixture in the presence of a little water at a temperature from about 104° to 127° C. for a period of from about 1–3 seconds followed by cooling and comminuting. The chocolate crumb may be used to produce milk chocolate by conventional methods. However, the capital cost of the extruder is very high, and the process reaction time is very short, which may inherently limit the range of flavors.

Great Britain Complete Patent Specification No. 1 537 377 describes a method of making a milk chocolate in which a mixture based on milk and sugar is prepared and then dried under reduced pressure to form a product of the crumb type which is compressed under a pressure of at least 100 kg/cm$^2$ and subsequently processed into milk chocolate. However, the process is only concerned with the production of white crumb, the vacuum/evaporation process is carried out at a temperature of only about 80° C., and at such a low temperature there will be little or no caramelisation and a restricted flavor.

German Patent Application Publication No. DE 35 02 446 describes a method for the preparation of chocolate crumb which comprises mixing milk powder and icing sugar and water at about 80° C. and then adding cocoa paste and heat to about 100° to 110° C. in a slowly revolving mixer (the water and heat being introduced in the form of steam through nozzles), followed by drying. However, the use of icing sugar is more expensive than ordinary sugar and gives a different texture. In addition, icing sugar causes the formation of large lumps which can increase the viscosity and cause blockages. Further, this document gives no indication of the reaction time nor the quantities of ingredients used, except the water.

SUMMARY OF THE INVENTION

We have found that by reacting a mixture of ingredients which comprise milk solids and a sugar, and optionally cocoa solids, and which has a water content of from 1.2 to 8% in a mixer at a temperature of 85° to 180° C. for a period of from 2.5 to 25 minutes followed by drying to a moisture content of less than 3%, not only is an excellent crumb obtained for the preparation of chocolate products, but the flavor also can be tailored to requirements by adjusting the temperature, time and water content.

Accordingly, the present invention provides a process for the preparation of crumb products for preparing chocolate products which comprises adding together and mixing and heating ingredients which comprise milk solids and a sugar, in the absence or presence of cocoa solids, and wherein the ingredients have a water content of from 1.2 to 8% by weight based on the weight of the mixture, in a mixer to a temperature of 85° to 120° C., maintaining the mixture at a temperature of 85° to 180° C. for a period of from 2.5 to 25 minutes to obtain a heat-treated reaction product and then drying the reaction product to a moisture content of less than 3% by weight based on the total weight of the mixture.

The present invention also provides a concentrated crumb product comprising low-fat milk solids and sugar, and optionally cocoa solids, wherein the ratio of milk solids to sugar is between 1:15 and 1:0.1. When cocoa solids are present, the amount of cocoa solids in the concentrated chocolate crumb preferably is from 10 to 15% by weight based on the total weight of the mixture.

The present invention also provides a method for making a milk chocolate product which comprises mixing a crumb product prepared by the crumb-making process of the present invention with further ingredients (cocoa liquor, cocoa butter and butter oil) employed for making milk chocolate products and processing the ingredients to prepare a milk chocolate product such as wherein the mixture is refined by means of refining rollers, conched and then tempered.

DETAILED DESCRIPTION OF THE INVENTION

For practice of the crumb-making process of the present invention, the milk solids may comprise, for example, whole milk powder, whey proteins or low fat milk solids. The low fat milk solids preferably contain less than 5% by weight of fats, more preferably less than 2% by weight of fats and are most preferably skimmed milk powder, or ingredients thereof or recombined dairy solids. The amount of milk solids may be from 20 to 70% and preferably from 25 to 65% by weight based on the total weight of the mixture.

The sugar used is preferably in the form of a dry powder which may be crystalline or in the form of a slurry. The sugar used may be, for example, sucrose, glucose, dextrose, lactose, fructose, invert sugar, corn syrup solids or sugar replacers such as polyols. e.g. sorbitol, mannitol, xylitol, maltitol, lactitol, polydextrose, etc., or mixtures thereof. Preferably, the sugar used is sucrose alone but, if desired, one or more other sugars may be used together with sucrose in an amount up to 25% by weight based on the total weight of the sugar, e.g. from 5 to 20% by weight based on the total weight of the sugar. If desired, a part of the sugar or sugar replacer may be replaced by a low calorie sweetening agent such as a cyclamate, aspartame or nutrasweet. The amount of sugar used may be from 10 to 75% and preferably from 20 to 70% by weight based on the total weight of the mixture.

In conventional processes of producing crumb for preparing chocolate products, the ratio of milk solids to sugar is conventionally from about 1:3 to 1:1.5 and more usually from 1:2.5 to 1:1.75, and such ratios may be used for preparing the crumb products of the present invention. However, in the process of the present invention, it is possible to produce a concentrated chocolate crumb by reducing the amount of sugar used in order to improve the processing and increase the production capacity. In this case, the ratio of milk solids to sugar may be between 1:1.5 and 1:0.1, preferably from 1:1.25 to 1:0.3 and especially from 1:1 to 1:0.75.

When the process is carried out in the absence of cocoa solids, a white crumb is obtained. When the process is carried out in the presence of cocoa solids, the cocoa solids may be in the form of cocoa liquor, cocoa powder or cocoa butter alternatives which are vegetable fats such as cocoa butter equivalents (CBE) or cocoa butter substitutes (CBS) which are well known to those skilled in the art, e.g. CBS laurics and CBS nonlaurics (see Minifie, Chocolate, Cocoa, and Confectionery; Third Edition, Chapman and Hall, New York, 1989, [Bernard W. Minifie; AVI],] pp. 100–109. The cocoa liquor may be conventional cocoa liquor produced by roasting cocoa beans, cooling, winnowing to form nibs and grinding the nibs to form a liquor containing from about 50 to 60% cocoa butter. The cocoa powder may be obtained by extracting the cocoa butter from the cocoa liquor by conventional methods. The amount of cocoa solids used in the process of the present invention may be from 3 to 20% by weight based on the total weight of the mixture. The amount of cocoa solids generally used in the concentrated chocolate crumb of the present invention may be from 5 to 15% by weight based on the total weight of the mixture.

It should be understood that the expression "chocolate crumb" used in this invention is intended to include crumb which may be used for making a compound coating or a substitute chocolate where some or all of the cocoa solids are replaced by cocoa butter alternatives, or which contain sugar replacers or ingredients such as carob or soya protein isolates. Compound coatings are well known to those skilled in the art (see again Minifie at pp. 165–182).

The amount of water used in the process of the present invention is preferably from 1.5 to 7.5% and more preferably from 1.75 to 6.5% by weight based on the total weight of the mixture.

The mixer may be a low- or high-shear mixer, e.g. a Lödige high-shear mixer (Batch mixer FKM 600D-Morton Machines Ltd.) having three ploughs fitted on the main shaft and two high-speed chopper blades. The speed of a low-shear mixer is usually from 50 to 100 rpm while that of a high-shear mixer is usually from 1000 to 3000 rpm. Speeds between 100 and 1000 rpm are also suitable in the process of this invention.

The mixing of the ingredients preferably provides a homogeneous mass, and the time required to raise the temperature to from 85° to 120° C. may be from 30 to 150 minutes, preferably from 60 to 120 minutes. The reaction time of the mixture at from 85° to 180° C. is preferably from 5 to 20 minutes. The reaction temperature is preferably from 90° to 120° C. After the reaction, the drying temperature may be from 60° to 80° C. and preferably from 65° to 75° C. The duration of the drying may be from 30 to 150 minutes and preferably from 60 to 120 minutes. The drying may be carried out without or with vacuum conditions, and if a vacuum process is used, the drying time is advantageously from 30 to 60 minutes. During drying, without or with vacuum conditions, the moisture content is preferably reduced to below 2% and more preferably to below 1% by weight based on the total weight of the mixture.

The flavor of milk chocolate prepared by the processes of the present invention can be varied according to desired requirements as desired by varying the reaction time, the reaction temperature and the water content during the reaction. Generally, the longer the reaction time, the higher the reaction temperature and the greater the water content, the more intense and complex are the flavors obtained.

For example, using a crumb containing a conventional ratio of milk solids to sugar of from 1:3 to 1:1.5, changes in processing conditions result in flavor differences between milk chocolate products prepared from the crumb as follows:

a) Increase of the reaction time between 5 and 25 minutes gives an increase of stale flavor.

b) Increase of the reaction temperature gives an increase of cocoa and milk smell, an increase of caramel and fruity flavors and a decrease of astringency and malt flavor.

c) Increase of the initial water content gives a decrease of cocoa flavor and an increase in caramel and butter flavors.

On the other hand, using a concentrated crumb containing a ratio of milk solids to sugar between 1:1.5 and 1:0.1, changes in processing conditions result in flavor differences between milk chocolate products prepared from the crumb as follows:

a) Increase of the reaction time between 5 and 25 minutes gives a decrease in milk flavor and an increase in cocoa and malt flavors.

b) Increase of the reaction temperature gives an increase of stale flavor, sweetness, and bitterness and an increase of caramel flavor.

c) Increase of the initial water content gives an increase of nutty flavor.

To summarise the above observations generally, for all the crumbs prepared according to the process of the present invention, the longer the reaction time, the higher the reaction temperature and the greater the specific range of the water content of the initial mix, the more intense and complex are the flavors obtained in milk chocolates produced from them. The milk chocolates prepared from a concentrated crumb are more astringent and creamier than the milk chocolates prepared from a crumb containing a conventional ratio of milk solids to sugar of from 1:3 to 1:1.5.

EXAMPLES

The following Examples further illustrate the present invention.

Example 1

40.95 kg of skimmed milk powder, 97.35 kg of sucrose and 11.7 kg cocoa liquor together with 3 kg (2%) water are fed in to the top of a Lödige high-shear mixer (Batch mixer FKM 600D) which is fitted with a water jacket and which has a thermostatic probe, a fan, three ploughs fitted to the main shaft running along the main mixer body wherein the distance between the surface of the ploughs and the mixer inner surface is 5–10 mm, two high-speed chopper blades, and an aspiration facility enabling rapid removal of moisture from the mix. (To a total moisture content of around 3.5%)

The ingredients are mixed and heated to 90° C. over a period of 90 minutes, reacted at 90° C. for 15 minutes using the high-shear chopper blades and then dried at 70° C. for 90 minutes with the fan turned on to reduce the moisture content to below 1% resulting in a crumb containing 64.9% sucrose, 27.3% milk solids and 7.8% cocoa liquor. Milk chocolate is prepared by adding to this crumb (70.55%), cocoa liquor (9.22%), cocoa butter (13.69%), butter oil (6.54%), vanillin crystals (0.04%), mixing for 5 minutes to form a homogeneous mass, passing through 2-roll and 5-roll refiners to give an average particle size of from 20–40 micrometers, followed by conching with the addition of 1.2% of a mix of lecithin and cocoa butter, tempering and molding by conventional methods. The milk chocolate produced has a caramel, milky, sweet crumb flavor.

Example 2

The procedure of Example 1 is repeated except that 6 kg (4%) water is added instead of 3 kg there used. The milk chocolate produced has a stronger caramel, biscuit crumb flavor.

Example 3

A concentrated crumb is produced having a milk solids to sugar ratio of about 1:0.9 by a similar process to that described in Example 1 but using 67.07 kg of skimmed milk powder, 63.78 kg of sucrose and 19.16 kg cocoa liquor together with 3 kg (2%) water. (To a total moisture content of around 7%)

The ingredients are mixed and heated to 90° C. over a period of 90 minutes, reacted at 90° C. for 15 minutes using the high-shear chopper blades and then dried at 70° C. for 90 minutes with the fan turned on to reduce the moisture content to below 1% resulting in a crumb containing 42.52% sucrose, 44.71% milk solids and 12.77% cocoa liquor. Milk chocolate is prepared by adding to this crumb (43.08%), sugar (27.47%), cocoa liquor (9.22%), cocoa butter (13.69%), butter oil (6.54%); and vanillin crystals (0.04%), mixing for 5 minutes to form a homogeneous mass, passing through 2-roll and 5-roll refiners to give an average particle size of from 20–40 micrometers, followed by conching with the addition of 1.2% of a mix of lecithin and cocoa butter, tempering and molding by conventional methods. The milk chocolate produced has a caramel crumb flavor which is more astringent and creamier than that of Example 1.

Example 4

A concentrated crumb is produced having a milk solids to sugar ratio of about 1:0.33 by a similar process to that described in Example 1 but using 98.14 kg of skimmed milk powder, 32.71 kg of sucrose and 19.15 kg cocoa liquor together with 9 kg (6%) water. The ingredients are mixed and heated to 90° C. over a period of 90 minutes, reacted at 90° C. for 15 minutes using the high-shear chopper blades and then dried at 70° C. for 90 minutes with the fan turned on to reduce the moisture content to below 1% resulting in a crumb containing 42.52% sucrose, 44.71% milk solids and 12.77% cocoa liquor. Milk chocolate is prepared by adding to this crumb the other ingredients of chocolate in a similar procedure to that described in Example 3. The milk chocolate produced has a caramel crumb flavor which is more astringent and creamier than that of Example 1.

What is claimed is:

1. A process for preparation of a crumb product for preparing chocolate products which comprises:

adding together and mixing and heating ingredients which comprise milk solids and a sugar ingredient which comprises sucrose so that the ingredients added together and mixed and heated have, by weight, a ratio of milk solids to sugar ingredient of between 1:0.1 and 1:3 and so that the ingredients being mixed and heated are heated-up to a temperature in a range of from 85° C. to 180° C. and then maintained at a temperature in the range of from 85° C. to 180° C. for a period of from 2.5 minutes to 25 minutes to obtain a heat-treated reaction product and wherein the ingredients added together and mixed and heated and the reaction product have a moisture content of between 1.2% and 8%; and then, drying the reaction product without vacuum conditions at a temperature of from 60° C. to 80° C. to obtain a dried reaction product and so that the dried reaction product has a moisture content of less than 3% by weight.

2. A process according to claim 1 further comprising, prior to maintaining the ingredients being mixed at the temperature in the range of from 85° C. to the heated-up temperature, mixing and heating the ingredients so that the ingredients are heated-up to a temperature in a range of from 85° C. to 120° C.

3. A process according to claim 1 wherein the sugar ingredient comprises sucrose in an amount by weight based upon the sugar ingredient weight of at least 75%.

4. A process according to claim 3 wherein the sugar ingredient further comprises a sugar replacer selected from the group consisting of sorbitol, mannitol, xylitol, maltitol, lactitol or polydextrose.

5. A process according to claim 1 wherein the ingredients added together and mixed and heated further comprise water added as an ingredient.

6. A process according to claim 1 wherein the ingredients added together and mixed and heated further comprise cocoa solids.

7. A process according to claim 6 wherein, by weight based upon a total weight of the ingredients added together and mixed and heated, the cocoa solids are present in an amount of from 3% to 20%.

8. A process according to claim 6 wherein, by weight, the cocoa solids are present in an amount of from 5% to 15%.

9. A process according to claim 1 wherein the cocoa solids are selected from the group consisting of cocoa liquor and cocoa powder.

10. A process according to claim 1 wherein the ingredients added together and mixed and heated further comprise a member selected from the group consisting of an equivalent of cocoa butter and of a substitute for cocoa butter.

11. A process according to claim 1 wherein the milk solids to sugar ingredient ratio is from 1:0.3 to 1:1.25.

12. A process according to claim 1 wherein the ingredients added together and mixed and heated and the reaction product prior to drying have a moisture content of from 1.5% to 7.5%.

13. A process according to claim 1 wherein the reaction product is dried to a moisture content of below 2% by weight.

14. A process according to claim 1 wherein the reaction product is dried at a temperature of from 60° C. to 75° C.

15. A process according to claim 1 wherein the milk solids are selected from the group consisting of whole milk powder, low-fat milk solids and whey proteins.

16. A process according to claim 15 wherein the milk solids are low-fat milk solids and the low-fat milk solids are selected from the group consisting of skimmed milk powder, ingredients of skimmed milk powder and recombined milk solids.

17. A process according to claim 1 wherein the sugar ingredient has a powder form.

18. A process according to claim 1 wherein the sugar ingredient further comprises a substance selected from the group consisting of glucose, dextrose, lactose, fructose, invert sugar and corn syrup solids.

* * * * *